2,120,400

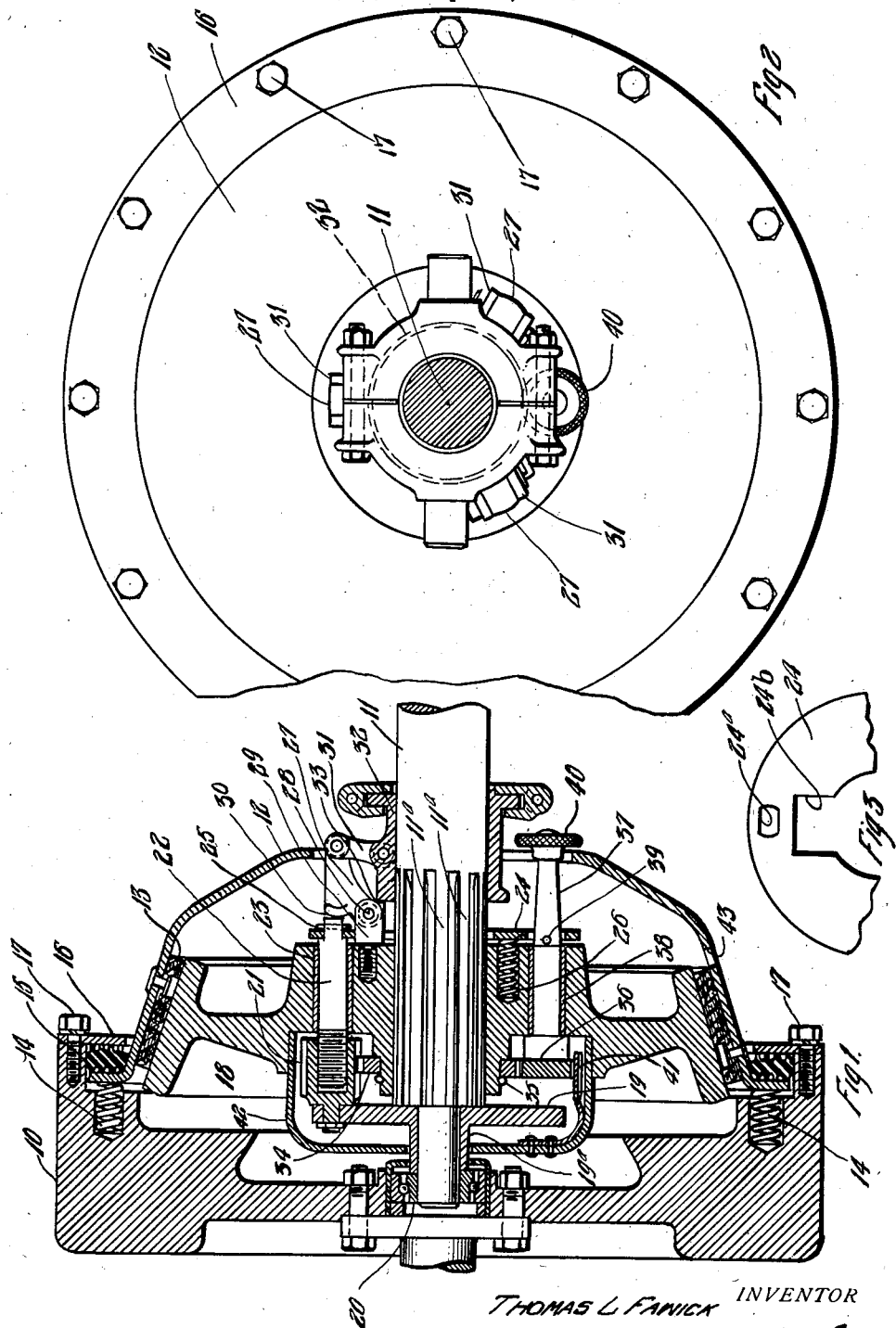
June 14, 1938. T. L. FAWICK 2,120,400
ASSEMBLY FOR CLUTCHES AND THE LIKE
Filed Sept. 8, 1936
THOMAS L FAWICK INVENTOR
BY Willard D. Eakin
ATTORNEY Patented June 14, 1938

UNITED STATES PATENT OFFICE 2,120,400

ASSEMBLY FOR CLUTCHES AND THE LIKE

Thomas L. Fawick, Akron, Ohio

Application September 8, 1936, Serial No. 99,867

26 Claims. (Cl. 192—66)

This invention relates to assemblies suitable for use in driving clutches, brakes and the like.

Its chief objects are to provide simplicity and economy of construction; durability; facility of adjustment, as in the case of compensating for wear; improved lubrication of actuating parts; protection of the parts from dirt, moisture, etc.; and a desirable cushioning action.

Of the accompanying drawing:

Fig. 1 is a vertical longitudinal section of a clutch mechanism embodying my invention in its preferred form.

Fig. 2 is an elevation of the same, taken from the right of Fig. 1, the driven shaft being shown in section.

Fig. 3 is a fragmentary view of a plate which is shown in section in Fig. 1.

Referring to the drawing, 10 is the fly-wheel of a motor and 11 is a driven shaft adapted to be connected to it by the clutch mechanism.

A housing 12, which can be a stamping, almost completely encloses the clutch mechanism and has the clutch-facing 13, comprising asbestos, mounted on its inner face. As here shown it is held in position for rotation with the fly-wheel by an external flange on its large end, adjacent the fly-wheel, which is at all times embraced with substantial pressure between a series of circumferentially spaced compression springs 14, 14, seated in recesses formed in the fly-wheel, and rubber or rubber-like cushioning means 15, preferably in the form of an endless ring having longitudinal groove-defining ribs on its opposite, gripping surfaces, which is retained, always under at least slight compression, by a metal ring 16 secured to an adjacent face of the fly-wheel by cap screws 17, 17, the grooves defined by the ribs serving to enhance the cushioning deformability of the rubber ring. The cushion 15 thus is adapted to be put under increased compression when the clutch member 18, splined upon the shaft 11, is forced into clutching engagement with the clutch-facing 13, which causes the rubber ring to grip more firmly the ring 16 and the flange of the housing clutch member 12 and thus to transmit the torque from the fly-wheel to the housing clutch member with a cushioning action. Although it is preferred to interpose this cushioning structure in the driving assembly, here comprising the outer clutch member, where it has the advantage of a long radius from the axis of rotation and where it can be interposed with lightness and simplicity of construction, and in such relation that the asbestos of the clutch facing (or brake lining) protects it from generated heat, its use is not limited to any particular location or to the external structure.

For moving the inner clutch member 18 along the splines 11ª, 11ª of the driven shaft to engage and disengage the clutch a plate 19 is mounted upon a reduced end portion of the shaft and is formed with a hub boss 19ª the end of which bears against the inner race of a ball-bearing 20 which is mounted in the hub of the fly-wheel and is so constructed as to serve as a thrust bearing for the hub 19ª of the plate 19 and as a radial bearing for the reduced end portion of the shaft 11.

A circumferentially spaced set of gears, such as the gear 21, preferably three or more of them, each formed with a journal stem, are journaled in the outer margin of the plate 19 and each of these gears is of cup shape and internally threaded and has screwed into it the threaded end portion of a push bar 22. The push bars are of generally cylindrical shape and are adapted to be given their general shape in a centerless grinder. They are slidably mounted in bronze bushings such as the bushing 23 which are pressed into apertures formed in the clutch member 18, and to keep them from turning in their bushings as the gears 21 are turned they are formed at their other ends with flat faces so that they fit non-rotatably in apertures such as the aperture 24ª formed in a plate 24, which is held in place upon the group of them by cotter pins such as that shown at 25.

For constantly urging the clutch member 18 with substantial pressure toward its de-clutched position a circumferentially-spaced set of compression springs such as the spring 26 are mounted in recesses formed in the clutch member 18 and bear against the plate 24.

For forcing the clutch member 18 into engagement with the clutch-facing 13, against the force of the springs 26, a circumferential series of bell-crank levers such as the lever 27, preferably three or more, are hinged as at 28 in bearing forks such as that shown at 29, each fork having a threaded stem by which it is mounted on the clutch member 18. Each of the bell-crank levers is formed at its elbow with a hardened and accurately ground contact surface 30 adapted to bear against the end of the adjacent push bar 22, which also is hardened and accurately ground, to provide the fulcrum for the action of the bell-crank levers.

Each of the levers 27 is connected by an over-center push link 31 with a clutch-actuating sleeve 32 slidably mounted upon the shaft 11 and provided with the usual means for sliding it forward and backward on the shaft.

The construction as described is such that movement of the sleeve 32 to the left as viewed in Fig. 1, until the links 31 are in vertical position with relation to the shaft, forces the clutch member 18 into its engaging position, in which it is locked by an over-center effect of the link 31 as the sleeve 32 contacts stop-shoulders formed on the levers 27, as at 33. Reverse movement of the sleeve 32, after the links 31 pass their vertical positions with relation to the shaft, pulls inward the adjacent arms of the bell-crank levers and thus permits the springs 26 to move the clutch member 18 away from the clutch facing 13.

The plate 24 is cut away as shown at 24ᵇ to accommodate the bearing forks 29.

For holding the gears 21 against undesired turning, and for turning them all alike for adjustment of the effective lengths of the push bars 22, a gear 34 is rotatably mounted and retained by a snap-ring 35 upon the hub of the clutch member 18 and is meshed with the gears 21 and with an adjusting gear 36 which is formed on one end of a shaft 37 journaled in a bushing 38 which is pressed in an aperture in the clutch member, the shaft being retained in position by a cotter pin 39 and extending through suitable openings in the plate 24 and the housing clutch member 12 to the exterior of the latter, where it is provided with a hand-grip disk 40, the construction being such that rotation of the shaft 37 will vary the effective length of all of the push-bars 22 alike.

For holding the shaft 37 and gears 36, 34 and 21 against undesired turning a yielding spring detent 41, engaging between the teeth of the gear 36, is mounted on the inner face of an oil-retaining cup or guard 42, which can be a stamping, and which is pressed into an annular recess formed in the clutch member 18 and is adapted to contain a large amount of oil for the lubrication of the clutch member on its splines, the gears, and the push-bars 22 in their bushings, notwithstanding the rotation of the assembly, which by centrifugal force keeps the oil from escaping between the member 42 and the member 19ᵃ even when they are not sealed to each other.

To permit the escape from the housing clutch member 12 of such small quantity of oil as may find its way through the several rotary and slide bearings, the housing clutch member is formed with at least one hole such as the hole 43, near the smaller end of the clutch facing.

The mode of operation has been adequately described along with the description of structure, and it will be seen that the assembly provides the advantages set out in the above statement of objects, and that the cushioning means permits substantial misalignment of the shafts without such strains upon the splines or other parts as to cause rapid wear, breakage or quick deterioration.

With regard to the expressions "force-receiving part" and "force-delivering part" appearing in several of the appended claims, it is to be noted that one of the two mating clutch structures comprises the fly-wheel 10, metal retaining ring 16, rubber cushioning ring 15, housing 12 and the clutch-facing 13 riveted to the inner face of the housing, and that of this structure the fly-wheel is the force-receiving part and the clutch-facing is the force-delivering part.

I claim:

1. The combination of relatively rotary members adapted for frictional engagement with each other, means comprising levers operatively connecting them for actuation, and means for shifting the fulcrums of the levers with relation to the one of said members which provides its fulcrum, the fulcrum-shifting means comprising a circumferentially-spaced series of bars slidably mounted for adjustment with relation to the said member providing the fulcrum and precision means for so adjusting the bars, said precision means comprising a set of cup-shaped members threaded upon the respective bars and each having an axially-projecting stem, means engaging said stems for rotatably holding the cup-shaped members in place, and means for concurrently rotating the cup-shaped members with relation to the bars.

2. The combination of a mounting for a circumferentially spaced series of slidably mounted bars, bars slidably but non-rotatably mounted therein, a series of cup-shaped members which internally have threaded engagement with the bars respectively, each of the cup-shaped members having an axially-projecting stem, means engaging their stems for rotatably holding them in place, and means for concurrently rotating the cup-shaped members with relation to the bars.

3. The combination of relatively rotary members adapted for frictional engagement with each other, a shaft upon which one of the members is slidably but non-rotatably mounted, fulcrum bars extending through the said slidably mounted member and having reaction against the other member for sustaining in compression the force for effecting engagement of the said frictionally engaging rotary members, and means for holding the fulcrum bars in different positions of adjustment in relation to the said other member.

4. The combination of relatively rotary members adapted for frictional engagement with each other, a shaft upon which one of the members is slidably but non-rotatably mounted, a bearing for the shaft mounted on the other member, and fulcrum bars extending through the said slidably mounted member and having reaction against the other member for sustaining the force for effecting engagement of the said frictionally engaging rotary members, and means for holding the fulcrum bars in different positions of adjustment in relation to the said other member, the said bearing being also a thrust-bearing for the assembly that comprises the slidably mounted member and the fulcrum bars.

5. The combination of relatively rotary members adapted for frictional engagement with each other, means comprising circumferentially spaced fulcrum bars extending through one of the members for effecting their engagement, means for holding the fulcrum bars in different positions of adjustment in relation to the other member, and a thrust bearing interposed operatively between said bars and the other member.

6. The combination of a mounting for a circumferentially spaced series of bars, a circumferentially spaced series of bars mounted therein, a series of gears which internally have threaded engagement with the bars respectively, and a gear intermeshed with a plurality of the first mentioned gears, the bars being held against relative rotation by a plate common to them and formed with non-round apertures occupied by non-round portions of the bars.

7. The combination of a mounting for a circumferentially spaced series of bars, a circumferentially spaced series of bars mounted therein, a series of gears which internally have threaded engagement with the bars respectively, a gear intermeshed with a plurality of the first-mentioned gears, and an oil retaining shell which with associated parts at least approximately encloses the gears and provides an annular, inwardly-facing trough.

8. The combination of a relatively rotary member, a housing secured thereto, a friction facing mounted on the inner face of the housing, and, within the housing, between it and the said member, a rotary member adapted for frictional engagement with the said facing, and, for forcing it into such engagement, a series of circumferentially-spaced bars extending through the second mentioned member, a thrust bearing interposed operatively between the bars and the other member, and means including levers and over-center links coacting with said bars.

9. The combination of a relatively rotary member, a housing secured thereto, a friction facing mounted on the inner face of the housing, and, within the housing, between it and the said member, a rotary member adapted for frictional engagement with the said facing, and, for forcing it into such engagement, a series of circumferentially-spaced bars extending through the second mentioned member, a thrust bearing interposed operatively between the bars and the other member, and means including levers coacting with said bars.

10. The combination of a relatively rotary member, a housing secured thereto, a heat-insulating friction facing mounted on the inner face of the housing, a rotary member within the housing adapted for frictional engagement with said facing, means for forcing it into such engagement, and cushioning means so interposed operatively between the force-receiving part and the force delivering part of the one of the two mating rotary assemblies which comprises the housing as to sustain all of the torque with a cushioning effect.

11. The combination of relatively rotary structures adapted for frictional engagement with each other, means for forcing them in an axial direction into such engagement, cushioning means comprising a rubber-like material so interposed operatively between the force-receiving part and the force-delivering part of one of the said structures as to transmit at least substantially all of the torque and sustain as a compressive force against it the force by which the two structures are held in frictional engagement.

12. The combination of relatively rotary structures adapted for frictional engagement with each other, means for forcing them in an axial direction into such engagement, cushioning means comprising a rubber-like material so interposed operatively between the force-receiving part and the force-delivering part of one of the said structures as to transmit at least substantially all of the torque and sustain as a compressive force against it the force by which the two structures are held in frictional engagement, and means for holding the said cushioning means under lesser compression when the two structures are not frictionally engaged.

13. The combination of relatively rotary structures adapted for engagement with each other, means for forcing them into such engagement, and cushioning means interposed operatively between the force-receiving part and the force-delivering part of one of said structures, the cushioning means comprising a strip of rubber-like material transmitting the torque by frictional engagement of at least one of its faces and formed with recesses enhancing its deformability.

14. The combination of relatively rotary structures adapted for frictional engagement with each other, means for forcing them in an axial direction into such engagement, and cushioning means interposed operatively between the force-receiving part and the force-delivering part of one of said structures, the cushioning means comprising a strip of rubber-like material formed with circumferentially disposed ribs defining circumferentially disposed channels and adapted to flex laterally under the force by which the two structures are held in frictional engagement.

15. The combination of two mating cone-clutch structures, one of them comprising a cushioning member of rubber-like material interposed operatively between its force-receiving and its force-delivering parts, and formed with flexible friction ribs.

16. The combination of two mating clutch structures, one of them comprising a cushioning member of rubber-like material so interposed operatively between rigid force-receiving and force-delivering parts thereof as to transmit at least substantially all of the torque and sustain as a compressive force against it the force by which the clutch structures are held in engagement and means additional to and acting through said cushioning member for holding the two structures in engagement.

17. The combination of two mating clutch structures, one of them comprising a cushioning member of rubber-like material so interposed operatively between rigid force-receiving and force-delivering parts thereof as to transmit at least substantially all of the torque and to sustain as a compressive force against it the force by which the clutch structures are held in engagement, and means for holding the cushioning member under lesser compression when the two clutch structures are not engaged.

18. In a clutch, the combination of a rigid rotary member and yielding means held pressed against opposite faces of said member at a distance from its clutch-engagement face, at least one of the yielding means being of rubber-like material receiving the force of clutch engagement as an increasing compressive force and transmitting at least substantially all of the torque by frictional engagement.

19. The combination of two mating clutch structures, one of them comprising a cushioning member of rubber-like material so interposed operatively between rigid force-receiving and force-delivering parts thereof as to receive the force of clutch engagement as an increasing compressive force and transmit at least substantially all of the torque by frictional engagement.

20. The combination of two mating clutch structures, one of them comprising a cushioning member of rubber-like material so interposed operatively between rigid force-receiving and force-delivering parts thereof as to transmit the torque by frictional engagement, the cushioning member being formed with flexible ribs on at least one of its frictional-engagement faces.

21. The combination of relatively rotary structures adapted for frictional engagement with each other, means for forcing them into such engagement, cushioning means comprising rubber-like material so interposed operatively between the force-receiving part and the force-delivering part of one of said structures as to transmit at least substantially all of the torque, and a heat-insulating friction facing on that structure.

22. The combination of two relatively rotary structures adapted for frictional engagement with each other, yielding means interposed operatively between the force receiving part and the force-delivering part of one of said structures and adapted to sustain the engaging force as an increasing force, and means for moving a part of one of the structures to a determinate position with relation to a part of the other structure for effecting the engagement.

23. The combination of two relatively rotary structures adapted for frictional engagement with each other, yielding means interposed operatively between the force receiving part and the force-delivering part of one of said structures and adapted to sustain the engaging force as an increasing force, means for moving a part of one of the structures to a determinate position with relation to a part of the other structure for effecting the engagement, and adjustment means for varying said determinate position to compensate for wear.

24. The combination of relatively rotary structures adapted for engagement with each other, means for forcing them into such engagement, and cushioning means comprising a face portion of rubber-like material so interposed operatively between the force-receiving part and the force-delivering part of one of said structures as to transmit torque solely by friction on at least that face, the said face being formed with frictional projections.

25. The combination of relatively rotary members adapted for engagement with each other and means for forcing them into such engagement, said means comprising a circumferential series of bars adapted to sustain the force of such engagement, abutment means for sustaining the thrust of the bars and, interposed between the last said means and said bars, spacer members screw-threaded upon the respective bars, and means for concurrently turning said members upon the bars.

26. The combination of relatively rotary members adapted for engagement with each other and means for forcing them into such engagement, said means comprising a circumferential series of bars adapted to sustain the force of such engagement, abutment means for sustaining the thrust of the bars and, interposed between the last said means and said bars, spacer members screw-threaded upon the respective bars, and means for concurrently turning said members upon the bars, each of said spacer members being formed with a stem journaled in the thrust sustaining means.

THOMAS L. FAWICK.